US012652231B2

(12) United States Patent
Vacchi et al.

(10) Patent No.: US 12,652,231 B2
(45) Date of Patent: Jun. 9, 2026

(54) DISTRIBUTED MESSAGE EXTENSIONS FOR RULES ENGINES

(71) Applicant: Red Hat, Inc., Raleigh, NC (US)

(72) Inventors: Edoardo Vacchi, Milan (IT); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 498 days.

(21) Appl. No.: 18/317,668

(22) Filed: May 15, 2023

(65) Prior Publication Data

US 2024/0388522 A1 Nov. 21, 2024

(51) Int. Cl.
H04L 45/02 (2022.01)
H04L 41/08 (2022.01)
(52) U.S. Cl.
CPC .............. H04L 45/02 (2013.01); H04L 41/08 (2013.01)
(58) Field of Classification Search
CPC .......... G06N 5/02; G06N 5/022; G06N 5/025; H04L 41/08; H04L 41/0893; H04L 41/0894; H04L 45/02
See application file for complete search history.

(56) References Cited

U.S. PATENT DOCUMENTS

| | | | | | |
|---|---|---|---|---|---|
| 10,419,368 | B1 * | 9/2019 | Gohil | .................... | H04L 69/321 |
| 2009/0271412 | A1 * | 10/2009 | Lacapra | ................ | G06F 16/178 |
| 2011/0040714 | A1 * | 2/2011 | Proctor | ................. | G06N 5/022 |
| | | | | | 706/50 |
| 2011/0071972 | A1 * | 3/2011 | Zmolek | .................. | G06Q 10/10 |
| | | | | | 706/46 |
| 2014/0201124 | A1 * | 7/2014 | Proctor | .................. | G06N 5/047 |
| | | | | | 706/47 |
| 2016/0124742 | A1 | 5/2016 | Rangasamy et al. | | |

(Continued)

FOREIGN PATENT DOCUMENTS

| | | |
|---|---|---|
| CN | 113254061 A | 8/2021 |
| WO | 202015573 A1 | 8/2020 |

OTHER PUBLICATIONS

Sayfan, Gigi: "Mastering Kubernetes—first 400 pages", May 2017, XP055822351, Retrieved from the Internet: URL: http://ndl.ethernet.edu .et/bitstream/123456789/40210/2/115.Gigi%20Sayfan.pdf.

(Continued)

*Primary Examiner* — Jeong S Park
(74) *Attorney, Agent, or Firm* — Womble Bond Dickinson (US) LLP

(57) ABSTRACT

Systems and methods are disclosed for partitioning a rules engine. An example method includes receiving a specification for a rules engine comprising a plurality of nodes. The method also includes identifying two or more partitions of the rules engine, wherein the two or more partitions comprise a first partition with a first node and at least a second partition with a second node. Each partition is connected to a root node of the rules engine and wherein the first node of the first partition is connected by an edge to the second node of the second partition. The method also includes instantiating the first partition in a first computational device, instantiating the second partition in a second computational device, and configuring a network communication channel between the first node of the first partition and the second node of the second partition.

20 Claims, 8 Drawing Sheets

(56)                References Cited

U.S. PATENT DOCUMENTS

| | | | | |
|---|---|---|---|---|
| 2016/0234234 | A1* | 8/2016 | McGrew | H04L 63/20 |
| 2016/0292574 | A1* | 10/2016 | Salam | G06N 20/00 |
| 2020/0379823 | A1* | 12/2020 | Lehmann | G06F 21/554 |
| 2022/0036206 | A1 | 2/2022 | Vacchi et al. | |
| 2023/0048581 | A1* | 2/2023 | Coviello | G06F 9/543 |
| 2023/0139783 | A1* | 5/2023 | Garib | G06N 3/044 |
| | | | | 707/769 |

OTHER PUBLICATIONS

Hu Yang et al: "Concurrent container scheduling on heterogeneous clusters with multi-resource constraints", Future Generation Computer Systems, vol. 102, Sep. 4, 2019 (Sep. 4, 2019), pp. 562-573, XP093132648, NL ISSN: 0167-739X, DOI: 10.1016/j.future.2019. 08.025. Retrieved from the Internet: URL: https://www.researchgate. net/profile/Zhiming-Zhao-4/publication/335628205_Concurrent_ container_scheduling_on_heterogeneous_clusters_with_multi-resource constraints/links/5de595a24585159aa45ca9e5/Concurrent-container-scheduling-on-heterogeneous-.

Anonymous: "Drools Documentation Version 6.5.0.—First 400 pages", Mar. 7, 2023 (Mar. 7, 2023), XP093132511, Retrieved from the Internet: URL: https://web.archive.org/web/20230307175938if_/ https://docs.drools.org/6.5.0.Final/drools-docs/pdf/drools-docs.pdf.

Anonymous: "Red Hat Decision Manager 7.5", Mar. 30, 2021 (Mar. 30, 2021), XP093132520, Retrieved from theInternet: URL: https:// access.redhat.com/documentation/en-us/red_hat_decision_manager/ 7.5/pdf/implementing_high_available_event-driven_decisioning_ using_the_decision_engine_on_red_hat_openshift_container_platform/ red_hat_decision_manager-7.5-implementing_high_available_ event-.

Anonymous: "OpenShift Container Platform 4.6 Architecture", Oct. 4, 2022 (Oct. 4, 2022), XP093132559, Retrieved from the Internet: URL: https://access. redhat.com/ documentation/en-us/openshift_ container_platform/4.6/pdf/architecture/ openshift_container_platform-4.6-architecture-en-us.pdf.

"Extended European Search Report from related EP Application No. EP23203643.4," mailed on, Apr. 3, 2024; pp. 1-11.

* cited by examiner

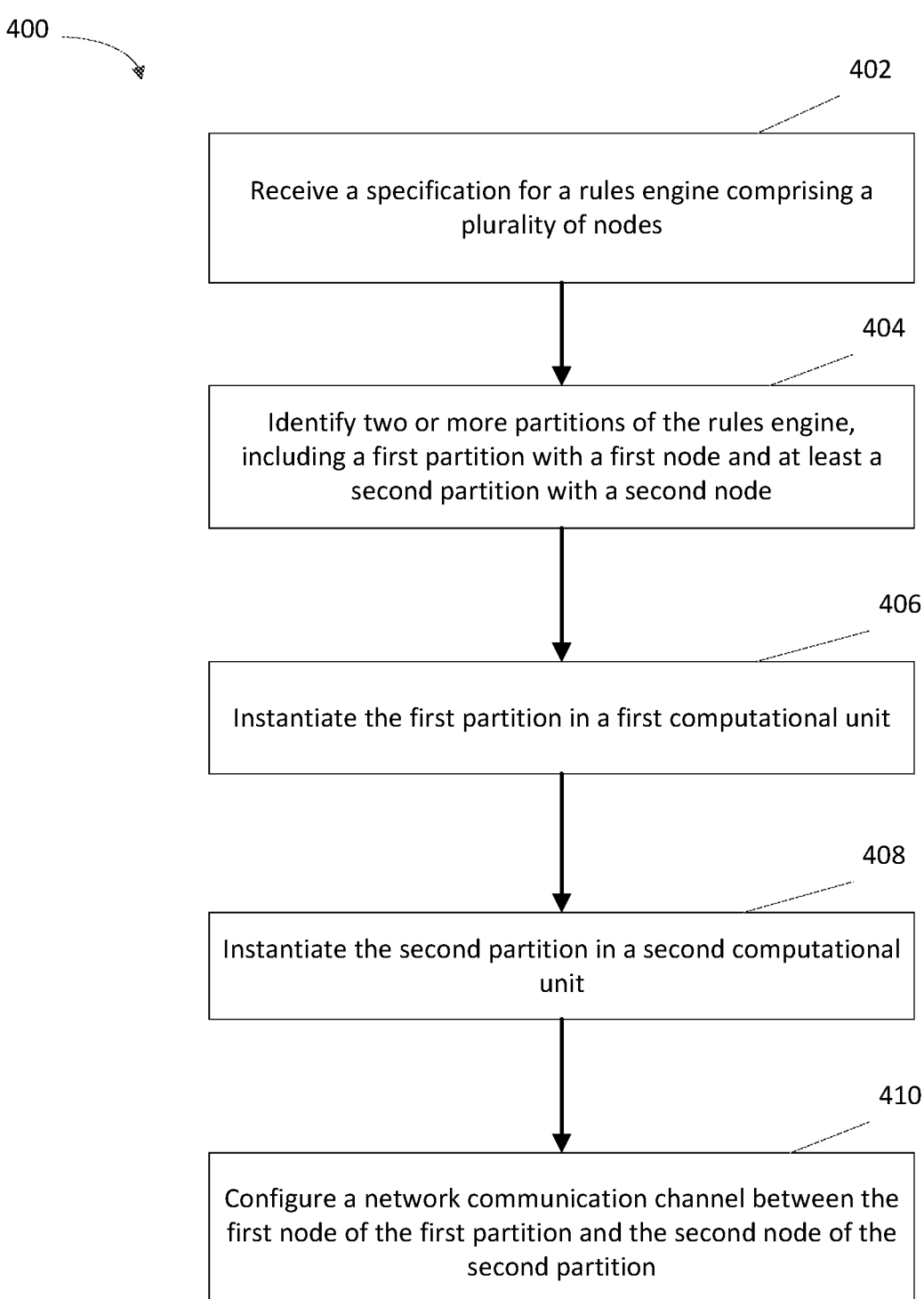

400

402

Receive a specification for a rules engine comprising a plurality of nodes

404

Identify two or more partitions of the rules engine, including a first partition with a first node and at least a second partition with a second node

406

Instantiate the first partition in a first computational unit

408

Instantiate the second partition in a second computational unit

410

Configure a network communication channel between the first node of the first partition and the second node of the second partition

Fig. 4

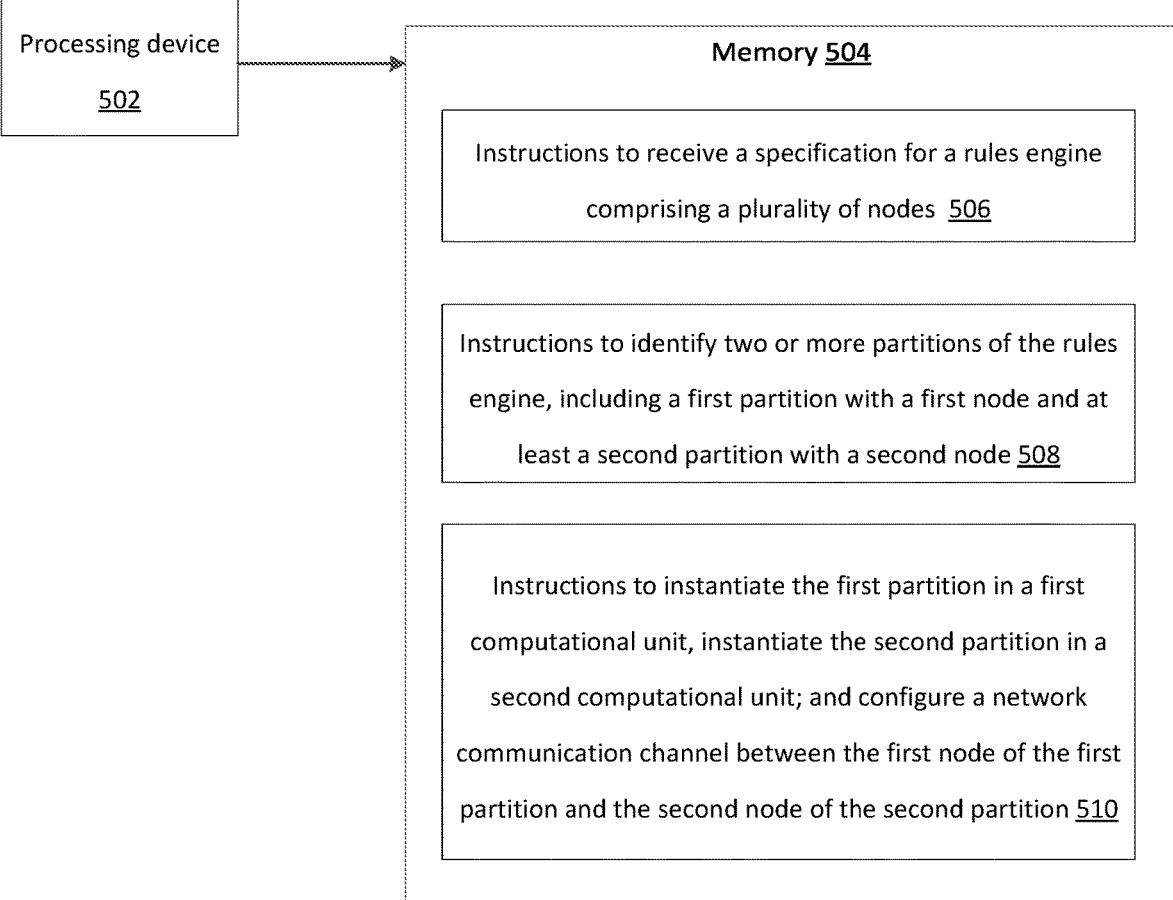

Processing device
502

Memory 504

Instructions to receive a specification for a rules engine comprising a plurality of nodes 506

Instructions to identify two or more partitions of the rules engine, including a first partition with a first node and at least a second partition with a second node 508

Instructions to instantiate the first partition in a first computational unit, instantiate the second partition in a second computational unit; and configure a network communication channel between the first node of the first partition and the second node of the second partition 510

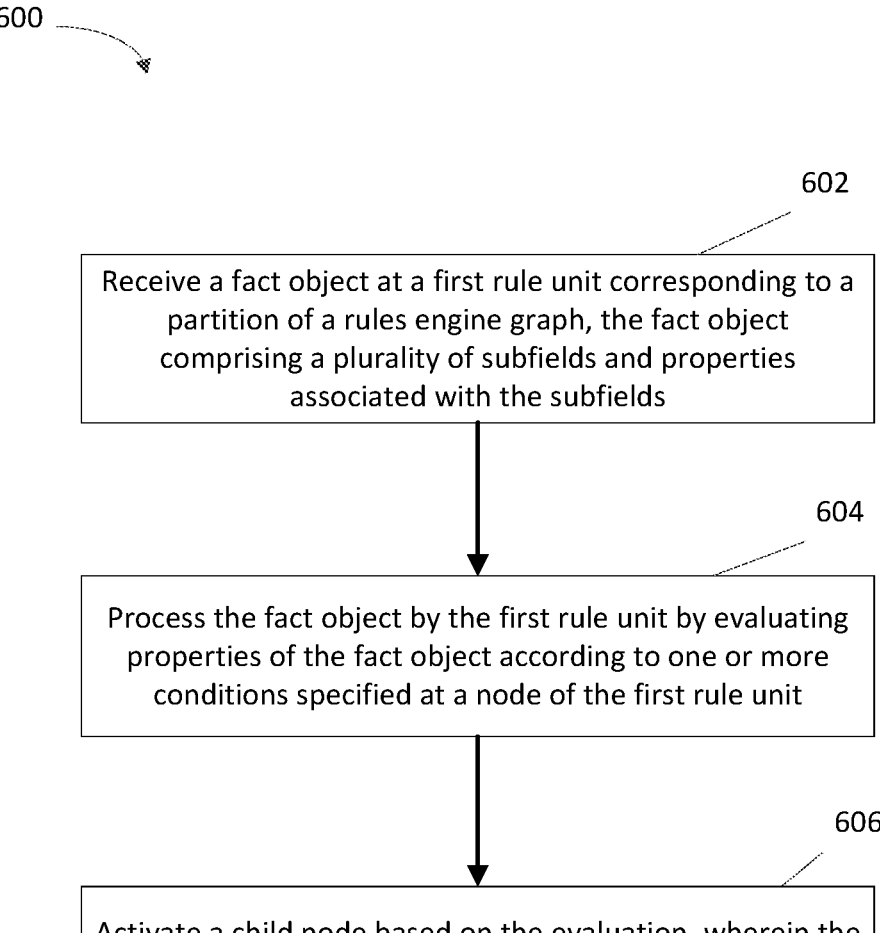

602

Receive a fact object at a first rule unit corresponding to a partition of a rules engine graph, the fact object comprising a plurality of subfields and properties associated with the subfields

604

Process the fact object by the first rule unit by evaluating properties of the fact object according to one or more conditions specified at a node of the first rule unit

606

Activate a child node based on the evaluation, wherein the child node is included in a second rule unit corresponding to a different partition of the rules engines graph, and wherein activating the child node comprises sending one or more subfields of the fact object to the second rule unit through a network communication channel

Fig. 6

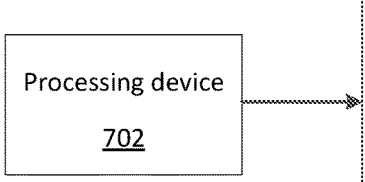

Processing device

702

Memory 704

Instructions to receive a fact object at a first rule unit corresponding to a partition of a rules engine graph, the fact object comprising a plurality of subfields and properties associated with the subfields 706

Instructions to process the fact object by the first rule unit by evaluating properties of the fact object according to one or more conditions specified at a node of the first rule unit 708

Instructions to activate a child node based on the evaluation, wherein the child node is included in a second rule unit corresponding to a different partition of the rules engines graph, and wherein activating the child node comprises sending one or more subfields of the fact object to the second rule unit through a network communication channel 710

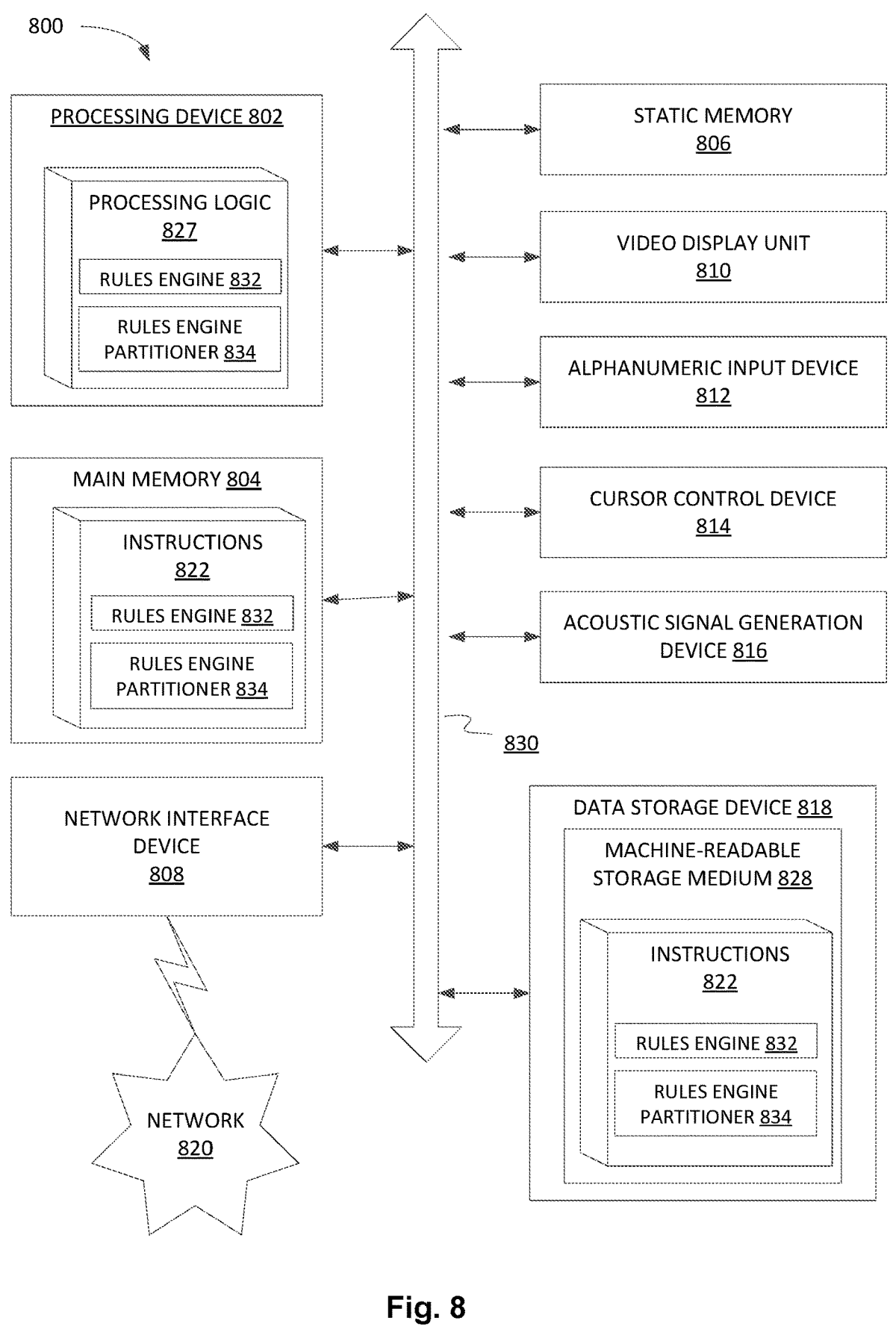

PROCESSING DEVICE 802

PROCESSING LOGIC
827

RULES ENGINE 832

RULES ENGINE
PARTITIONER 834

MAIN MEMORY 804

INSTRUCTIONS
822

RULES ENGINE 832

RULES ENGINE
PARTITIONER 834

NETWORK INTERFACE
DEVICE
808

NETWORK
820

STATIC MEMORY
806

VIDEO DISPLAY UNIT
810

ALPHANUMERIC INPUT DEVICE
812

CURSOR CONTROL DEVICE
814

ACOUSTIC SIGNAL GENERATION
DEVICE 816

830

DATA STORAGE DEVICE 818

MACHINE-READABLE
STORAGE MEDIUM 828

INSTRUCTIONS
822

RULES ENGINE 832

RULES ENGINE
PARTITIONER 834

Fig. 8

DISTRIBUTED MESSAGE EXTENSIONS FOR RULES ENGINES

TECHNICAL FIELD

Aspects of the present disclosure relate to distributed rules engine in a computer environment, and more particularly, to techniques for partitioning a rules engine.

BACKGROUND

A rules engine is a software system that executes rules with respect to facts of a computer system stored in the computer system's working memory. A rule is a small piece of code of the form of "when <condition> then <consequence>." The <condition> is a declarative constraint over part of the working memory, and the <consequence> is a snippet of executable code, written in some programming language. Rules engines are utilized in a variety of applications to apply the given rules to data to produce outcomes. For example, rules engines may be used in business process management, software management systems, decision support systems, event-driven architectures, and other applications.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a process flow diagram of a method for partitioning a rules engine, in accordance with some embodiments of the present disclosure.

FIG. 5 is a block diagram of a system for partitioning a rules engine, in accordance with some embodiments of the present disclosure.

FIG. 6 is a process flow diagram of a method for operating a rules engine, in accordance with some embodiments of the present disclosure.

FIG. 7 is a block diagram of a system for partitioning a rules engine, in accordance with some embodiments of the present disclosure.

FIG. 8 is a block diagram of an example computing device that may perform one or more of the operations described herein, according to some embodiments of the present disclosure.

DETAILED DESCRIPTION

Figure 1:
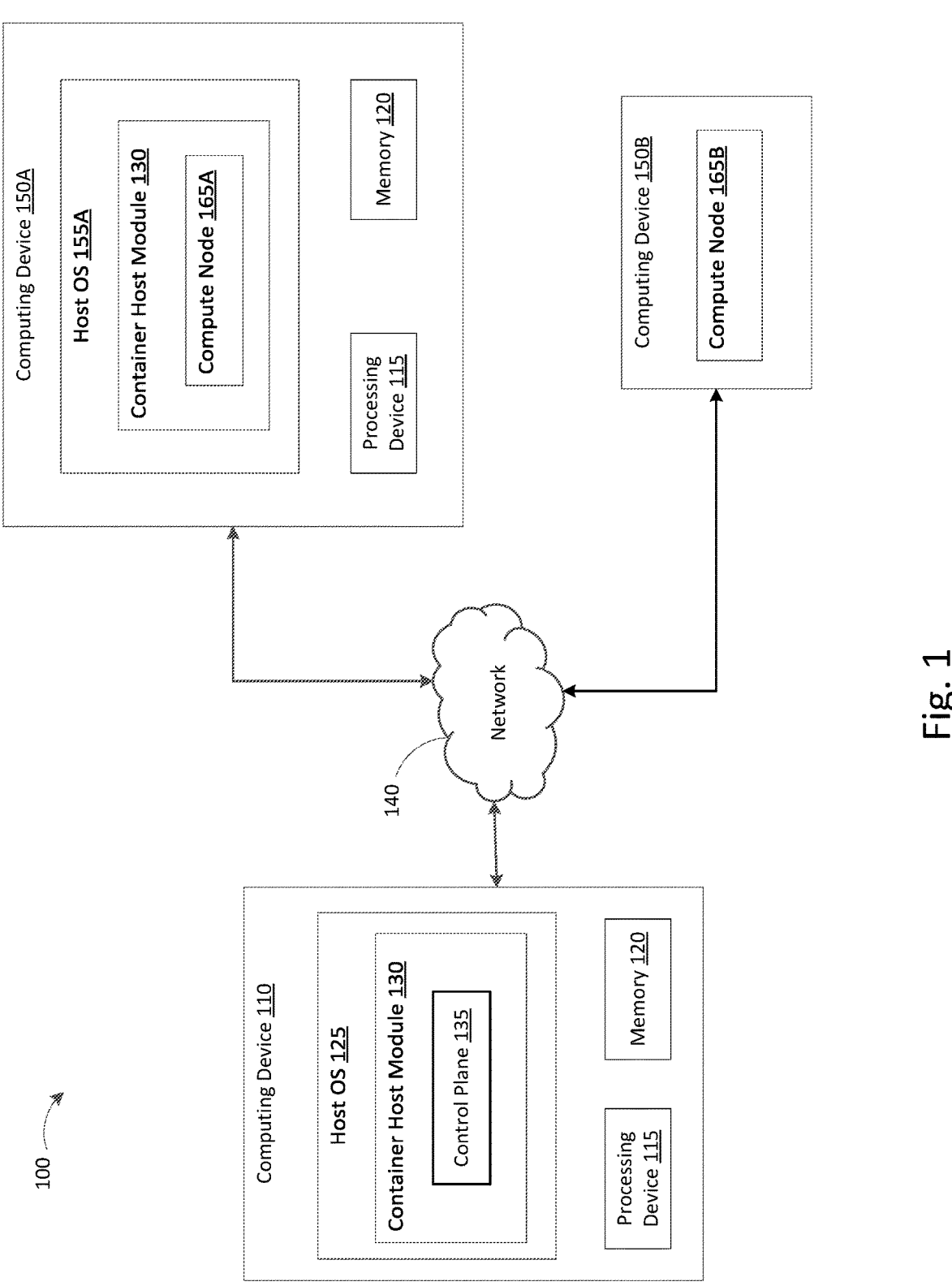
FIG. 1 is a block diagram that illustrates an example system, according to some embodiments of the present disclosure.

A rules engine is a software system that executes one or more rules (e.g. business rules) in a runtime environment. The present techniques can be implemented in various types of rules engines, including business rules engines and others. One type of rules engine is known as a Rete-based rules Engine, which implements the Rete algorithm, a pattern matching algorithm for implementing rule-based systems. A Rete-based rules engine represents the information as a directed acyclical graph of nodes with two main groups of nodes, known as alpha nodes and beta nodes. This directed graph is commonly referred to as a "Rete Network." However, the present disclosure refers to the Rete network as a Rete graph (e.g., alpha graph, beta graph) to avoid confusion with networked communications. More generally, the directed acyclical graph may be referred to as a rules engine graph.

A rules engine works by applying a set of rules to facts, which are input to the working memory of the rules engine. Evaluation of the facts according to the rules yields a set of one or more actions. Rule engines generally process the input facts more quickly than other programming techniques that rely on sequential processing of nested IF-THEN-ELSE statements since the logical structure by which the facts are processed is largely pre-programmed in the structure of the directed graph. However, rules engines such as Rete-based rules engines use a large working memory to achieve the increased processing speed.

Due to interdependence of the rules, which all rely on the same working memory, rules engines may be deployed entirely within a single computational device. However, the directed graph, and the memory used to support the graph, may become extremely large if the number of rules is large. Accordingly, large rules engines may not be deployable in computational devices with constrained resources, such as Internet-of-Things (IoT) devices.

Embodiments of the present disclosure provide an automated technique for partitioning a rules engine. Each partition may then be deployed in separate computational devices that can operate in parallel. Such partitioning may be more easily accomplished when the only connection between the two partitions is at the root node and there are no other interdependencies between the nodes of the two partitions, i.e., no edges between the nodes of separate partitions. In such a case, each separate partition can receive facts from the root node via networked communications, and processing can be performed separately for each partition.

In some cases, there may be parts of a rules engine that are loosely coupled, meaning that the parts have a small number of edge connections between the nodes. These loosely coupled parts of the rules engine are more difficult to partition since the processing of one partition may depend on the results of processing performed in another partition. Embodiments of the present disclosure describe techniques for partitioning such loosely connected portions of a rules engine graph.

In accordance with some embodiments, the rules engine graph specification is processed to automatically identify portions of the graph that are suitable for partitioning. Based on the discovered partitions, various services may be defined for implementing the rules engine, including a set of network communication services that enable communication from the root node to the separate partitions. Additionally, one or more side channels may be configured to enable networked communication between the nodes of the partitions.

The present disclosure provides an approach that improves the operation of a computer system by enabling the partitioning of a rules engine into smaller portions that can reside on two or more separate computational devices. In other words, a large rules engine can be implemented in two or more computational devices in situations where the rules engine would exhaust the resources of a single one of the computational devices. In some embodiments, the root node and the partitions may be implemented as separate services (e.g., microservices) within a distributed, cloud-based infrastructure.

FIG. 1 is a block diagram that illustrates an example system 100 according to some embodiments of the present disclosure. As illustrated in FIG. 1, system 100 includes a computing device 110, and a plurality of computing devices 150 (150A and 150B). The computing devices 110 and 150 may be coupled to each other (e.g., may be operatively coupled, communicatively coupled, may communicate data/messages with each other) via network 140. Network 140 may be a public network (e.g., the Internet), a private network (e.g., a local area network (LAN) or wide area network (WAN)), or a combination thereof. In some embodiments, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 150.

Computing devices 110 and 150 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may include any suitable type of computing device or machine that has a programmable processor including, for example, server computers, desktop computers, laptop computers, tablet computers, smartphones, set-top boxes, etc. In some embodiments, each of the computing devices 110 and 150 may include a single machine or may include multiple interconnected machines (e.g., multiple servers configured in a cluster). The computing devices 110 and 150 may be implemented by a common entity/organization or may be implemented by different entities/organizations. For example, computing device 110 may be operated by a first company/corporation and one or more computing devices 150 may be operated by a second company/corporation. Each of computing device 110 and computing devices 150 may execute or include an operating system (OS) such as host OS 125 and host OS 155A respectively, as discussed in more detail below. The host OS of computing devices 110 and 150 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 150 may each implement a compute node (e.g., as part of the container orchestration engine).

In some embodiments, a container orchestration engine 130 (referred to herein as container host 130), such as the Redhat™ OpenShift™ module, may execute on the host OS 125 of computing device 110 and the host OS 155A of computing device 150, as discussed in further detail herein. The container host module 130 may be a platform for developing and running containerized applications and may allow applications and the data centers that support them to expand from just a few machines and applications to thousands of machines that serve millions of clients. Container host 130 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 130 provides a function-based architecture of smaller, decoupled units that work together. In some embodiments, computing device 150 may execute on an operational cloud.

Container host 130 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 130 or a registry server. In some embodiments, the image file may include one or more base layers. An image file may be shared by multiple containers. When the container host 130 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 130 may work with are referred to as "pods." In some embodiments, a pod may be one or more containers deployed together on a single host, and the smallest compute unit that can be defined, deployed, and managed. Each pod is allocated its own internal IP address, and therefore may own its entire port space. Containers within pods may share their local storage and networking. In some embodiments, pods have a lifecycle in which they are defined, are assigned to run on a node, and run until their container(s) exit or they are removed based on their policy and exit code. Although a pod may contain more than one container, the pod is the single unit that a user may deploy, scale, and manage. The control plane 135 of the container host 130 may include replication controllers (not shown) that indicate how many pod replicas are required to run at a time and may be used to automatically scale an application to adapt to its current demand.

By their nature, containerized applications are separated from the operating systems where they run and, by extension, their users. The control plane 135 may expose applications to internal and external networks by defining network policies that control communication with containerized applications (e.g., incoming HTTP or HTTPS requests for services inside the cluster 165).

A typical deployment of the container host 130 may include a control plane 135 and a cluster of compute nodes 165, including compute nodes 165A and 165B (also referred to as compute machines). The control plane 135 may include REST APIs which expose objects as well as controllers which read those APIs, apply changes to objects, and report status or write back to objects. The control plane 135 manages workloads on the compute nodes 165 and also executes services that are required to control the compute nodes 165. For example, the control plane 135 may run an API server that validates and configures the data for pods, services, and replication controllers as well as provides a focal point for the cluster 165's shared state. The control plane 135 may also manage the logical aspects of networking and virtual networks. The control plane 135 may further provide a clustered key-value store (not shown) that stores the cluster 165's shared state. The control plane 135 may also monitor the clustered key-value store for changes to objects such as replication, namespace, and service account controller objects, and then enforce the specified state.

The cluster of compute nodes 165 are where the actual workloads requested by users run and are managed. The compute nodes 165 advertise their capacity and a scheduler (not shown), which is part of the control plane 135, determines which compute nodes 165 containers and pods will be started on. Each compute node 165 includes functionality to accept and fulfill requests for running and stopping container workloads, and a service proxy, which manages communication for pods across compute nodes 165. A compute node 165 may be implemented as a virtual server, logical container, or GPU, for example.

Figure 2:
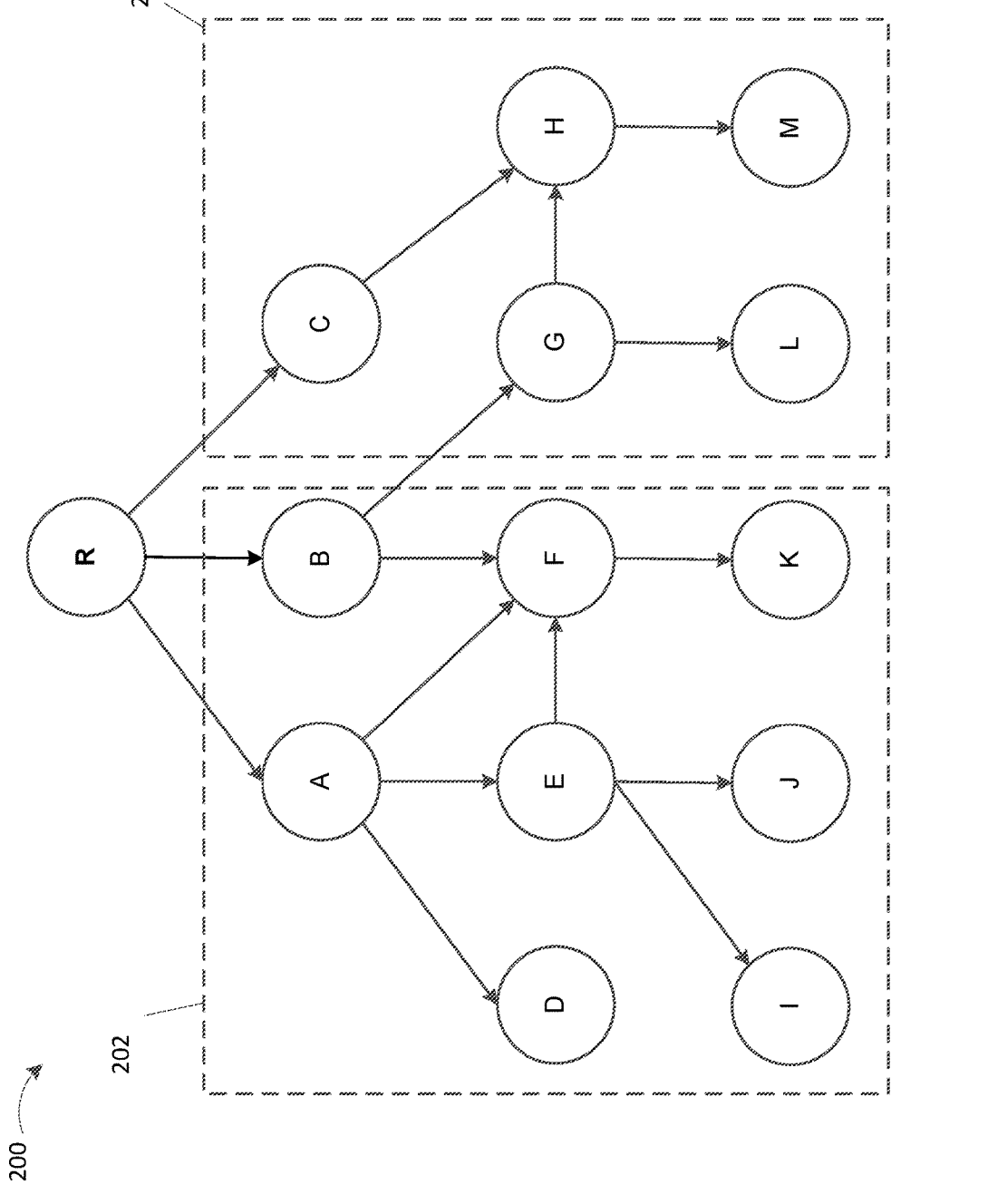
FIG. 2 is a block diagram that illustrates an example rules engine graph, in accordance with some embodiments of the present disclosure.

FIG. 2 is a block diagram that illustrates an example rules engine graph 200, in accordance with some embodiments of the present disclosure. The rules engine represented in FIG. 2 may be a software system that executes rules with respect to the state of its working memory, which contains the state of the system onto which rules are evaluated. Each piece of data input into the working memory may be referred to as a fact. In one embodiment, a rule is a small piece of code of the form when <condition> then <consequence>. The condition may be a constraint over part of the working memory. The consequence, also referred to herein as an action, may be a snippet of executable code, written in some programming language.

The rule engine graph 200 may represent all of a portion of a rules engine. In some embodiments, the rule engine graph 200 may represent a Rete graph or a portion of a Rete graph, for example, the alpha nodes of a Rete graph. The facts may be asserted to the working memory of the rule engines by inputting an object at the root node, R, of the rules engine graph 200. An object is a collection of one or more facts. For example, the object may be an n-tuple, which may contain an any suitable number of attributes or properties, i.e., facts. Each node of the rule engine graph 200 may be an alpha node that matches attributes of an object against constant values, or against attributes of the same object, or expressions derived by constant values or attributes of the same objects. In some examples, the rules engine graph may also include beta nodes, which can be used to matching attributes of the inserted object against attributes of other, previously matched objects. Beta nodes may be referred to as "joins".

To execute the rules in a rules engine, the rules engine graph 200 may be traversed to identify which nodes are affected by the insertion of a new fact. When a fact object is asserted to the working memory at the root node, the root node applies a condition against the attributes of the object and, based on the outcome of the condition, activates one or more of the root node's direct child nodes referred to herein as nodes A, B, and C. The root node passes the object to each of the activated child nodes. Each of these child nodes may apply one or more conditions to the attributes of the object, activating additional child nodes and passing the object through the rules engine graph 200 accordingly. In some embodiments, the bottom level of the rules engine graph 200 (e.g., the leaf nodes I, K, L, and M) may be connected a consequence. In some embodiments, the leaf nodes may be further connected to a beta graph (not shown), which joins the outcome of various alpha nodes according to the configuration dictated by the rules.

The rules engine may be described using a rules engine specification, which defines the rules engine, including the connections between the nodes, the conditions applied at each node, and the actions to be applied (e.g., the code to be executed) when the applicable conditions are satisfied, etc. The rules engine specification may be generated by a user through a Business Rules Management System (BRMS), for example. The rules engine specification may be stored as one more files, which can be used to instantiate the rules engine within a computational device. Partitioning the rules engine enables the rules engine to be instantiated on more than one computational device. To partition the rules engine, the rules engine specification may be processed automatically to identify portions of the rules engine graph 200 that are strongly connected and/or loosely connected.

In some embodiments, the identification of portions of the rules engine graph 200 that can be partitioned is performed by a partitioning algorithm based, at least in part, on a number of edges between the nodes of different portions. Portions of the rules engine graph 200 that are not to be partitioned are referred to herein as "strongly connected" while those portions of the rules engine graph 200 that can be partitioned are referred to herein "loosely connected". Determining whether a group of nodes is strongly connected or loosely connected may be performed by determining the number of edges between the nodes and comparing the number of edges to a threshold. For example, the threshold may be one, two, or three edge connections. Any suitable grouping of nodes connected to the root node and having fewer than the threshold number of connections to other groupings of nodes may be identified as partitionable. Additional factors may also be used to generate the partitions. For example, the partitioning algorithm may determine a segmentation that results in a specified maximum number of partitions, or a maximum or minimum number of nodes per partition.

As shown in FIG. 2, the rules engine graph 200 has been segmented into two partitions, a first partition 202 containing nodes A, B, D, E, F, I, J, and K, and a second partition 204 containing nodes C, G, H, L, and M. Each partition is coupled to the root node, R. Additionally, the first partition 202 and the second partition 204 have a single edge connection between their respective nodes (between nodes B and G). For at least this reason, the grouping of nodes included in the first partition 202 may be considered loosely coupled to the grouping of nodes included in the second partition 204.

The identification of partitions may be performed using any suitable partitioning algorithm. For example, the partitioning algorithm may include a variation of the Dijkstra algorithm, which is a shortest path problem with a cost metric applied to the edges. For example, the cost metric may be a weight applied to each edge that indicates the size of the data payload of the edge if the edge were implemented using networked communications. The data payload describes the amount of data to be passed to the downstream node from the upstream node. The shortest path problem enables the identification of edges that would have a relatively small data payload compared to other edges within the rule engine graph. In some embodiments, the partitioning may be performed by minimizing the cost function of the edges between partitions, which may have the effect of selecting partitions with fewer edges between them and a smaller data payload to be transferred between the partitions through networked communications.

It will be appreciated that the specific rules engine graph shown in FIG. 2 could be segmented differently, depending on the details of the specific partitioning algorithm. In some embodiments, the partitioning algorithm may be applied recursively to identify additional sub-partitions. For example, the partitioning algorithm could be applied the first partition 202 to further split the first partition 202 into additional partitions. Additionally, it will be appreciated that the rules engine graph shown in FIG. 2 is only one example of a rules engine graph and that a typical rules engine graph may include many additional nodes, which may be connected in any suitable manner based on the applicable dependencies described by the rules.

The output of the partitioning algorithm may be a description of two or more separate rules engine partitions, each of which can be instantiated in different computational devices, e.g., different virtual machines, containers, or physical computers. The output of the partitioning algorithm may also describe side-channel communication links between the partitions. Networked communication channels may be deployed to enable communication between the partitions at these side channels. An example implementation of a partitioned rules engine is shown in FIG. 3.

In some embodiments, one or more nodes may be stateful, meaning that the evaluation of the conditions applicable for that node relies on external information in addition to the facts asserted to the rule engine by the object. In such cases, it may be possible that one partition would rely on an element of data that is not accessible from that partition. The partitioning algorithm may include a check that determines whether any of the nodes of a partition are stateful, in which case, the partitioning algorithm would prevent the partitioning.

Figure 3:
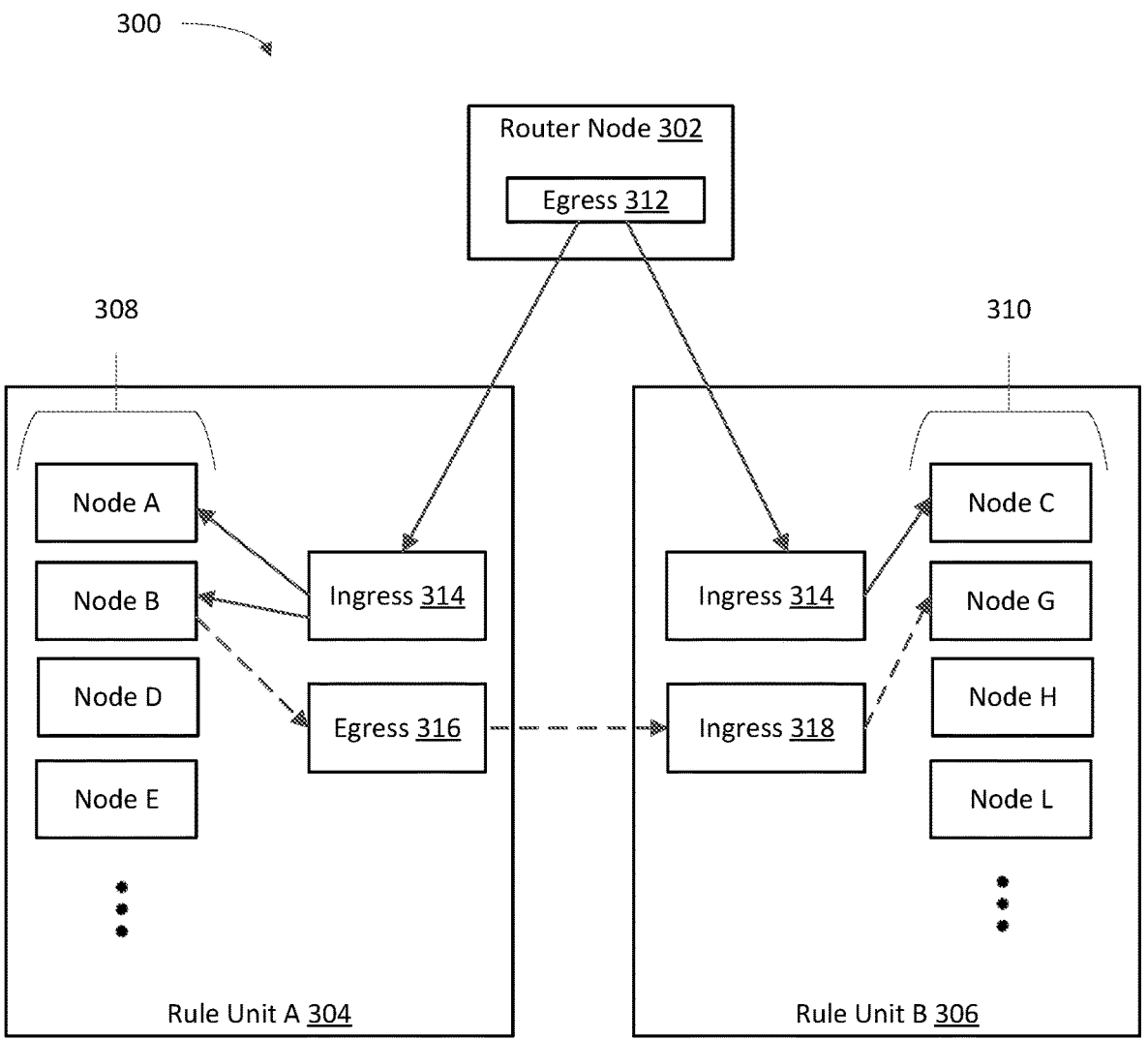
FIG. 3 is a block diagram of a system for instantiating the partitioned rules engine of FIG. 2, in accordance with some embodiments of the present disclosure.

FIG. 3 is a block diagram of a system for instantiating the partitioned rules engine of FIG. 2, in accordance with some embodiments of the present disclosure. The system includes a router node 302 and a rule unit for each partition of the partitioned rules engine, referred to herein as rule unit A 304 and rule unit B 306. Each of the rule units 304 and 306 is a computational device such as a personal computing device, server, virtual machine, or container, for example. As used herein, the computational device refers to a physical or virtual computing device that includes one or more processors and an associated working memory connected to the processor(s) via a memory bus. The working memory is the computational device's main memory, which commonly implemented using a random-access memory (RAM). Each of the rule units 304 and 306 includes its own separate working memory, which is not directly accessible to the other rule units through a memory bus. Thus, communication between the rule units is accomplished through networked communications (e.g., network 140 of FIG. 1). In some embodiments, the rule units 304 and 306 may be separate compute nodes 165A and 165B within a containerized computing system 100 such as the computing system of FIG. 1, and communication between the rule units 304 and 306 occurs via the network 140. In some embodiments, the computation units may be separate virtual machines or separate containers. Other configurations are also possible. Additionally, although two rule units are shown, it will be appreciated that a system in accordance with embodiments may include additional rule units depending on the number of partitions identified for the rules engine.

In the example shown in FIG. 3, rule unit A 304 is the instantiation of the first partition 202 of FIG. 2 and the nodes 308 of rule unit A 304 include nodes A, B, D, E, F, I, J, and K. The rule unit B 306 is the instantiation of the second partition 204 of FIG. 2 and the nodes 310 of rule unit B 306 include includes nodes C, G, H, L, and M.

The router node 302 represents the root node, R, of the rules engine shown in FIG. 2. The router node 302 may be deployed independently from the rule units 304 and 306 on a separate computational device coupled to the rule units 304 and 306 through networked communications. In some embodiments, the router node 302 may be a separate compute node within a containerized computing system 100 such as the computing system of FIG. 1. Communication between the router node 302 and the rule units 304 and 306 may occur via the network 140 of FIG. 1.

For each fact object asserted to the rules engine 300, the router node 302 is configured to evaluate the condition specified by the root node, R, of the rules engine graph 200 and activate the appropriate child nodes A, B. and/or C depending on the outcome of the evaluation. To activate the node, the router node 302 sends the object to the corresponding rule unit 304 and/or 306 via a networked communication channel, which may be an HTTP channel, a Kafka messaging channel, and others.

In some embodiments, the networked communications may be provided by microservices, referred to herein as ingress services and egress services. In the example shown. the router node 302 includes an egress service 312 that is configured to generate a message to send to the ingress services 314 of the respective rule units 304 and 306. The ingress service 314 of each rule unit may be configured to route messages received from the router node 302 to the top-layer nodes of the respective rules graph partitions. The top layer nodes are often referred to as "type" nodes since they route the object to child nodes depending on the object's type. In the depicted example, the ingress service 314 of the rule unit A 304 routes the object received from the router node 302 to node A and node B, and the ingress service 314 of the rule unit B 306 routes the object received from the router node 302 to node C. Each rule unit can process the object independently and activate one or more actions based on evaluation of the conditions in light of the data contained within the fact object.

The system 300 also includes a side channel for implementing networked communication between the rule units 304 and 306. Specifically, the side channel shown in FIG. 3 includes an egress 316 residing in rule unit A 304 and ingress 318 residing in rule unit B 306. The side channel enables communication between node B of rule unit A 304 and node G of rule unit B 306. The egress service 316 is accessed by node B if the evaluation of the Node B conditions causes the activation of node G, in which case, the egress service 316 generates a message to be sent to node G through ingress 318. The message includes a data payload, which may be the fact object or one or more subfields thereof.

Each rule unit 304 306 may be exposed as a containerized microservice. In some embodiments, the rule units 304 and 306 are declared using one or more image files as described in relation to FIG. 1, or by any other suitable method and file type. In some embodiments, the rule unit microservice may be packaged in a container image (e.g. via Docker) to generate a rule unit container. Each rule unit container may be deployed on a container platform such as Kubernetes or Redhat™ OpenShift™. The container platform can implement the rules engine by reading the image file applicable to each partition and configuring each partition as a separate microservice, including the binding of some nodes (e.g., nodes B and G) to appropriate side channels through any suitable message passing service, including Kafka and others.

Partitioning the rules engine into two computational devices connected through network communications introduces the possibility that the network may sometimes be unreliable or unavailable. Accordingly, the rules engine can be configured to handle problems with the network, such as dropped or corrupted packets. For example, the receiving nodes (node G in this example) can be configured to provide an acknowledgment message to the sending nodes (node B in this example) upon activation. If the sending node does not receive an acknowledgement within a specified amount of the time, the sending node may attempt to resend the message or cause the rules engine to issue an error message to the user.

It will be appreciated that the system 300 is an example system corresponding to the rule engine graph of FIG. 2, and that various changes may be made depending on the configuration of the rules engine and the identified partitions. For example, additional egress and ingress services may be instantiated to handle additional side channels if the partitions are joined by more than one edge. Furthermore, it will be appreciated that the techniques disclosed herein can be used to split a rules engine into any suitable number of partitions depending on the design considerations of a particular implementation, such as the size of the rules engine graph and the resources available on each of the computational devices.

FIG. 4 is a process flow diagram of a method 400 for partitioning a rules engine, in accordance with some embodiments of the present disclosure. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by processing device 115 shown in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed. The method 400 may begin at block 402.

At block 402, a specification for a rules engine is received. The rules engine may be specified as a rules engine graph which includes a plurality of nodes. Each node describes a set of one or more conditions and a resulting action to be performed if the conditions are satisfied. For example, the action may be to activate a child node or to implement a business decision, for example. The rules engine graph may be an alpha graph portion of a Rete graph.

At block 404, two or more partitions of the rules engine are identified. The partitions are segments of the rules engine that can be separated and implemented on different computation units (e.g. rule units). The two or more partitions can include a first partition with multiple nodes and at least a second partition also with multiple nodes. Each partition may be connected to a root node of the rules engine. Additionally, at least some of the partitions may be connected to other partitions through an edge connection. For example, a node of the first partition (referred to herein as first node) may be connected by an edge to a node of the second partition (referred to herein as second node).

At block 406, the first partition is instantiated in a first computational device. For example, with reference to FIG. 3, the first partition may be instantiated as rule unit A 304.

At block 408, the second partition is instantiated in a second computational device. For example, with reference to FIG. 3, the second partition may be instantiated as rule unit B 306.

At block 410, a network communication channel is configured between the first node of the first partition and the second node of the second partition. Blocks 406, 408, and 410 may be repeated for additional partitions and additional edge connections.

To instantiate the partitions and the communication channels in a distributed containerized computing system, one or more image files may be generated based on the configuration of the rules engine after being partitioned at block 404. The image files may be used to create container instances. The partitions may also be implemented as separate virtual machines or separate discrete computing devices coupled by a communication network.

FIG. 5 is a block diagram of a system for partitioning a rules engine, in accordance with some embodiments of the present disclosure. The system 500 includes a processing device 502 operatively coupled to a memory 504. The memory 504 includes instructions that are executable by the processing device 502 to cause the processing device 502 to partition a rules engine.

The memory 504 includes instructions 506 to receive a specification for a rules engine comprising a plurality of nodes. The memory 504 includes instructions 508 to identify two or more partitions of the rules engine, wherein the two or more partitions comprise a first partition with a first node and at least a second partition with a second node. The memory 504 includes instructions 510 instantiate the first partition in a first computational device, instantiate the second partition in a second computational device, and configure a network communication channel between the first node of the first partition and the second node of the second partition.

It will be appreciated that various alterations may be made to the process illustrated in FIG. 5 and that some components and processes may be omitted or added without departing from the scope of the disclosure.

FIG. 6 is a process flow diagram of a method 600 for operating a rules engine, in accordance with some embodiments of the present disclosure. Method 600 may be performed by processing logic that may include hardware, software, firmware, or a combination thereof. In some embodiments, at least a portion of method 600 may be performed by processing device 115 shown in FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed. The method 600 may begin at block 602.

At block 602, a fact object is received at a first rule unit corresponding to a partition of a rules engine graph. The fact object may be an n-tuple or other type of structured data that includes a plurality of subfields and properties associated with the subfields. The rules engine graph may be an alpha graph portion of a Rete graph.

At block 604, the fact object is processed by the first rule unit by evaluating properties of the fact object according to one or more conditions specified at a node of the first rule unit. For example, the first rule unit may be rule unit A 304 of FIG. 3.

At block 606, a child node is activated based on the evaluation. The child node is included in a second rule unit corresponding to different partition of the rules engines graph. For example, the second rule unit may be rule unit B 306 of FIG. 3. Activating the child node includes sending one or more subfields of the fact object to the second rule unit through a network communication channel.

FIG. 7 is a block diagram of a system for partitioning a rules engine, in accordance with some embodiments of the present disclosure. The system 700 includes a processing device 702 operatively coupled to a memory 704. The memory 704 includes instructions that are executable by the processing device 702 to cause the processing device 702 to partition a rules engine.

The memory 704 includes instructions 706 to receive a fact object at a first rule unit corresponding to a partition of a rules engine graph, wherein the fact object includes a plurality of subfields and properties associated with the subfields. The memory 704 includes instructions 708 to process the fact object by the first rule unit by evaluating properties of the fact object according to one or more conditions specified at a node of the first rule unit. The memory 704 includes instructions 710 to activate a child node based on the evaluation, wherein the child node is included in a second rule unit corresponding to a different partition of the rules engines graph. To activate the child node comprises to send one or more subfields of the fact object to the second rule unit through a network communication channel.

It will be appreciated that various alterations may be made to the process illustrated in FIG. 7 and that some components and processes may be omitted or added without departing from the scope of the disclosure.

FIG. 8 illustrates a diagrammatic representation of a machine in the example form of a computer system 800 within which a set of instructions, for causing the machine to perform any one or more of the methodologies discussed herein.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 800 may be representative of a server.

The exemplary computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 818 which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In some embodiments, video display unit 810, alphanumeric input device 812, and cursor control device 814 may be combined into a single component or device (e.g., an LCD touch screen).

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute rule evaluation instructions 825, for performing the operations and steps discussed herein.

The data storage device 818 may include a machine-readable storage medium 828, on which is stored one or more instructions 822 (e.g., software) embodying any one or more of the methodologies of functions described herein. For example, the instructions 822 may include a rules engine 832 and a rules engine partitioner 834 for automatically identifying partitions of the rules engine 832 and configuring the rules engine 832 one two or more computational devices. The instructions 822 may also reside, completely or at least partially, within the main memory 804 or within the processing device 802 during execution thereof by the computer system 800; the main memory 804 and the processing device 802 also constituting machine-readable storage media. The instructions 822 may further be transmitted or received over a network 820 via the network interface device 808.

The machine-readable storage medium 828 may be used to store instructions to perform a method for intelligently scheduling containers, as described herein. While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method. The method includes receiving a specification for a rules engine comprising a plurality of nodes, wherein each node of the plurality of nodes describes a condition and an action to be performed if the condition is satisfied. The method also includes identifying, by a processing device, two or more partitions of the rules engine, wherein the two or more partitions comprise a first partition with a first node and at least a second partition with a second node, wherein each partition is connected to a root node of the rules engine and wherein the first node of the first partition is connected by an edge to the second node of the second partition. The method also includes instantiating the first partition in a first computational device, instantiating the second partition in a second computational device, and configuring a network communication channel between the first node of the first partition and the second node of the second partition.

Example 2 includes the method of example 1. In this example, the method includes configuring a second network communication channel between the root node and the first partition, and configuring a third network communication channel between the root node and the second partition.

Example 3 includes the method of any one of examples 1 to 2. In this example, the network communication channel is a Kafka message passing service.

Example 4 includes the method of any one of examples 1 to 3. In this example, the first computational device is a first container of a distributed computing system, and the second computational device is a second container of the distributed computing system.

Example 5 includes the method of any one of examples 1 to 4. In this example, processing the specification to identify two or more partitions comprises processing a shortest path problem to minimize a cost function that relates to an amount of data to be transferred between the partitions.

Example 6 includes the method of any one of examples 1 to 5. In this example, processing the specification to identify two or more partitions comprises identifying portions of the rules engine that have fewer than a threshold number of edge connections between the portions.

Example 7 includes the method of any one of examples 1 to 6. In this example, processing the specification to identify two or more partitions comprises determining whether any of the nodes are stateful and preventing the partition if any of the nodes are stateful.

Example 8 includes the method of any one of examples 1 to 7. In this example, the plurality of nodes are alpha nodes of a Rete Graph.

Example 9 is a system. The system includes a processing device and a memory to store instructions that, when executed by the processing device cause the processing device to receive a specification for a rules engine comprising a plurality of nodes, wherein each node of the plurality of nodes describes a condition and an action to be performed if the condition is satisfied. The instructions also cause the processing device to identify, by the processing device, two or more partitions of the rules engine, wherein the two or more partitions comprise a first partition with a first node and at least a second partition with a second node, wherein each partition is connected to a root node of the rules engine and wherein the first node of the first partition is connected by an edge to the second node of the second partition. The instructions also cause the processing device to instantiate the first partition in a first computational device, instantiate the second partition in a second computational device, and configure a network communication channel between the first node of the first partition and the second node of the second partition.

Example 10 includes the system of example 9. In this example, the instructions cause the processing device to configure a second network communication channel between the root node and the first partition, and configure a third network communication channel between the root node and the second partition.

Example 11 includes the system of any one of examples 9 to 10. In this example, the network communication channel is a Kafka message passing service.

Example 12 includes the system of any one of examples 9 to 11. In this example, the first computational device is a first container of a distributed computing system, and the second computational device is a second container of the distributed computing system.

Example 13 includes the system of any one of examples 9 to 12. In this example, to identify two or more partitions, the instructions cause the processing device to process a shortest path problem to minimize a cost function that relates to an amount of data to be transferred between the partitions.

Example 14 includes the system of any one of examples 9 to 13. In this example, to identify two or more partitions, the instructions cause the processing device to identify portions of the rules engine that have fewer than a threshold number of edge connections between the portions.

Example 15 includes the system of any one of examples 9 to 14. In this example, to identify two or more partitions, the instructions cause the processing device to determine whether any of the nodes are stateful and prevent the partition if any of the nodes are stateful.

Example 16 includes the system of any one of examples 9 to 15. In this example, the plurality of nodes are alpha nodes of a Rete Graph.

Example 17 is a non-transitory computer readable medium. The computer-readable medium includes instructions that direct the processor to receive a specification for a rules engine comprising a plurality of nodes, wherein each node of the plurality of nodes describes a condition and an action to be performed if the condition is satisfied. The instructions also direct the processor to identify two or more partitions of the rules engine, wherein the two or more partitions comprise a first partition with a first node and at least a second partition with a second node, wherein each partition is connected to a root node of the rules engine and wherein the first node of the first partition is connected by an edge to the second node of the second partition. The instructions also direct the processor to instantiate the first partition in a first computational device, instantiate the second partition in a second computational device, and configure a network communication channel between the first node of the first partition and the second node of the second partition.

Example 18 includes the computer-readable medium of example 17. In this example, the first computational device is a first container of a distributed computing system, and the second computational device is a second container of the distributed computing system.

Example 19 includes the computer-readable medium of any one of examples 17 to 18. In this example, to identify two or more partitions, the instructions cause the processing device to process a shortest path problem to minimize a cost function that relates to an amount of data to be transferred between the partitions.

Example 20 includes the computer-readable medium of any one of examples 17 to 19. In this example, to identify two or more partitions, the instructions cause the processing device to identify portions of the rules engine that have fewer than a threshold number of edge connections between the portions.

Example 21 is a method of operating a rules engine. The method includes receiving a fact object at a first rule unit corresponding to a partition of a rules engine graph, the fact object comprising a plurality of subfields and properties associated with the subfields. The method also includes processing the fact object by the first rule unit by evaluating properties of the fact object according to one or more conditions specified at a node of the first rule unit. The method also includes activating a child node based on the evaluation, wherein the child node is included in a second rule unit corresponding to a different partition of the rules engines graph, and wherein activating the child node comprises sending one or more subfields of the fact object to the second rule unit through a network communication channel.

Example 22 includes the method of example 21. In this example, receiving the fact object at the first rule unit comprises receiving the fact object from a root node of the rules engine over a second network communication channel.

Example 23 includes the method of any one of examples 21 to 22. In this example, the network communication channel is a Kafka message passing service.

Example 24 includes the method of any one of examples 21 to 23. In this example, the first rule unit is executed in a first container of a distributed computing system and the second rule unit is executed in a second container of the distributed computing system.

Example 25 includes the method of any one of examples 21 to 24. In this example, the first rule unit is executed in a first computing device and the second rule unit is executed in a second computing device.

Example 26 includes the method of any one of examples 21 to 25. In this example, the method includes sending an acknowledgement message from the child node of the second rule unit to the node of the first rule unit through the network communication channel to indicate successful activation of the child node.

Example 27 includes the method of any one of examples 21 to 26. In this example, the method includes suspending execution of the first rule unit until an acknowledgement message is received from the child node of the second rule unit.

Example 28 includes the method of any one of examples 21 to 27. In this example, first rule unit and the second rule unit each comprise a plurality of alpha nodes of a Rete Graph.

Example 29 is a system. The system includes a processing device and a memory to store instructions that, when executed by the processing device cause the processing device to receive a fact object at a first rule unit corresponding to a partition of a rules engine graph, the fact object comprising a plurality of subfields and properties associated with the subfields. The instructions also cause the processing device to process the fact object by the first rule unit by evaluating properties of the fact object according to one or more conditions specified at a node of the first rule unit. The instructions also cause the processing device to activate a child node based on the evaluation, wherein the child node is included in a second rule unit corresponding to a different partition of the rules engines graph, and wherein to activate the child node comprises to send one or more subfields of the fact object to the second rule unit through a network communication channel.

Example 30 includes the system of example 29. In this example, to receive the fact object at the first rule unit comprises to receive the fact object from a root node of the rules engine over a second network communication channel.

Example 31 includes the system of any one of examples 29 to 30. In this example, the network communication channel is a Kafka message passing service.

Example 32 includes the system of any one of examples 29 to 31. In this example, the first rule unit is executed in a first container of a distributed computing system and the second rule unit is executed in a second container of the distributed computing system.

Example 33 includes the system of any one of examples 29 to 32. In this example, the first rule unit is executed in a first computing device and the second rule unit is executed in a second computing device.

Example 34 includes the system of any one of examples 29 to 33. In this example, the instructions cause the processing device to receive an acknowledgement message from the child node of the second rule unit through the network communication channel to determine successful activation of the child node.

Example 35 includes the system of any one of examples 29 to 34. In this example, the instructions cause the processing device to suspend execution of the first rule unit until an acknowledgement message is received from the child node of the second rule unit.

Example 36 includes the system of any one of examples 29 to 35. In this example, first rule unit and the second rule unit each comprise a plurality of alpha nodes of a Rete Graph.

Example 37 is an apparatus. The apparatus includes means to receive a fact object at a first rule unit corresponding to a partition of a rules engine graph, the fact object comprising a plurality of subfields and properties associated with the subfields. The apparatus also includes means to process the fact object at the first rule unit by evaluating properties of the fact object according to one or more conditions specified at a node of the first rule unit. The apparatus also includes means to activate a child node based on the evaluation, wherein the child node is included in a second rule unit corresponding to a different partition of the rules engines graph, and wherein the means to activate the child node comprises means to send one or more subfields of the fact object to the second rule unit through a network communication channel.

Example 38 includes the apparatus of example 37, including or excluding optional features. In this example, the means to receive the fact object at the first rule unit comprises means to receive the fact object from a root node of the rules engine graph over a second network communication channel.

Example 39 includes the apparatus of any one of examples 37 to 38, including or excluding optional features. In this example, the first rule unit is executed in a first container of a distributed computing system and the second rule unit is executed in a second container of the distributed computing system.

Example 40 includes the apparatus of any one of examples 37 to 39, including or excluding optional features. In this example, the apparatus includes means to suspend execution of the first rule unit until an acknowledgement message is received from the child node of the second rule unit.

Unless specifically stated otherwise, terms such as "receiving," "identifying," "routing," "activating," "providing," "sending," "instantiating," "configuring" or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method, comprising:

receiving a specification for a rules engine comprising a plurality of nodes, wherein each node of the plurality of nodes describes a condition and an action to be performed if the condition is satisfied;

identifying, by a processing device, two or more partitions of the rules engine, wherein the two or more partitions comprise a first partition with a first node and at least a second partition with a second node, wherein the first node of the first partition and the second node of the second partition are each connected to a root node of the rules engine and wherein the first partition is connected by an edge to the second partition;

instantiating the first partition in a first computational device;

instantiating the second partition in a second computational device; and configuring a network communication channel between the first node of the first partition and the second node of the second partition.

2. The method of claim 1, further comprising configuring a second network communication channel between the root node and the first computational device, and configuring a third network communication channel between the root node and the second computational device.

3. The method of claim 1, wherein the network communication channel is a Kafka message passing service.

4. The method of claim 1, wherein the first computational device is a first container of a distributed computing system and the second computational device is a second container of the distributed computing system.

5. The method of claim 1, wherein identifying two or more partitions comprises processing a shortest path problem to minimize a cost function that relates to an amount of data to be transferred between the two or more partitions.

6. The method of claim 1, wherein identifying two or more partitions comprises identifying portions of the rules engine that have fewer than a threshold number of edge connections between the portions.

7. The method of claim 1, wherein identifying two or more partitions comprises determining whether any of the nodes are stateful and preventing a partitioning of the rules engine if any of the nodes are stateful.

8. The method of claim 1, wherein the plurality of nodes are alpha nodes of a Rete Graph.

9. A system comprising:

a processing device; and a memory to store instructions that, when executed by the processing device cause the processing device to:

receive a specification for a rules engine comprising a plurality of nodes, wherein each node of the plurality of nodes describes a condition and an action to be performed if the condition is satisfied;

identify, by the processing device, two or more partitions of the rules engine, wherein the two or more partitions comprise a first partition with a first node and at least a second partition with a second node, wherein the first node of the first partition and the second node of the second partition are each connected to a root node of the rules engine and wherein the first partition is connected by an edge to the second partition;

instantiate the first partition in a first computational device;

instantiate the second partition in a second computational device; and configure a network communication channel between the first node of the first partition and the second node of the second partition.

10. The system of claim 9, wherein the instructions cause the processing device to configure a second network communication channel between the root node and the first partition, and configure a third network communication channel between the root node and the second partition.

11. The system of claim 9, wherein the network communication channel is a Kafka message passing service.

12. The system of claim 9, wherein the first computational device is a first container of a distributed computing system, and the second computational device is a second container of the distributed computing system.

13. The system of claim 9, wherein, to identify two or more partitions, the instructions cause the processing device to process a shortest path problem to minimize a cost function that relates to an amount of data to be transferred between the partitions.

14. The system of claim 9, wherein, to identify two or more partitions, the instructions cause the processing device to identify portions of the rules engine that have fewer than a threshold number of edge connections between the portions.

15. The system of claim 9, wherein, to identify two or more partitions, the instructions cause the processing device to determine whether any of the nodes are stateful and prevent the partition if any of the nodes are stateful.

16. The system of claim 9, wherein the plurality of nodes are alpha nodes of a Rete Graph.

17. A non-transitory computer readable medium, comprising instructions stored thereon which, when executed by a processing device, cause the processing device to:

receive a specification for a rules engine comprising a plurality of nodes, wherein each node of the plurality of nodes describes a condition and an action to be performed if the condition is satisfied;

identify, by the processing device, two or more partitions of the rules engine, wherein the two or more partitions comprise a first partition with a first node and at least a second partition with a second node, wherein the first node of the first partition and the second node of the second partition are each connected to a root node of the rules engine and wherein the first partition is connected by an edge to the second partition;

instantiate the first partition in a first computational device;

instantiate the second partition in a second computational device; and configure a network communication channel between the first node of the first partition and the second node of the second partition.

18. The non-transitory computer readable medium of claim 17, wherein the first computational device is a first container of a distributed computing system, and the second computational device is a second container of the distributed computing system.

19. The non-transitory computer readable medium of claim 17, wherein, to identify two or more partitions, the instructions cause the processing device to process a shortest path problem to minimize a cost function that relates to an amount of data to be transferred between the partitions.

20. The non-transitory computer readable medium of claim 17, wherein, to identify two or more partitions, the instructions cause the processing device to identify portions of the rules engine that have fewer than a threshold number of edge connections between the portions.

\* \* \* \* \*